United States Patent [19]

Eicken et al.

[11] Patent Number: 5,770,662
[45] Date of Patent: Jun. 23, 1998

[54] MODIFIED RESINS MADE FROM THE REACTION OF EPOXIDIZED ESTERS AND RESIN ACIDS

[75] Inventors: Ulrich Eicken, Korshenbroich; Manfred Gorzinski, Duesseldorf; Paul Birnbrich, Solingen; Thomas Tamcke, Duesseldorf, all of Germany

[73] Assignee: Henkel Kommanditgesellschaft Auf Aktien (Henkel KGaA), Dusseldorf, Germany

[21] Appl. No.: 716,144

[22] PCT Filed: Mar. 9, 1995

[86] PCT No.: PCT/EP95/00862

§ 371 Date: Sep. 18, 1996

§ 102(e) Date: Sep. 18, 1996

[87] PCT Pub. No.: WO95/25773

PCT Pub. Date: Sep. 28, 1995

[30] Foreign Application Priority Data

Mar. 18, 1994 [DE] Germany .................. 44 06 240.7

[51] Int. Cl.⁶ .................................................. C08F 283/00
[52] U.S. Cl. ................ 525/530; 528/110; 528/111.5; 528/295.5; 528/297
[58] Field of Search ............... 525/530; 528/110, 528/111.5, 295.5, 297

[56] References Cited

U.S. PATENT DOCUMENTS

| | | | |
|---|---|---|---|
| 3,632,855 | 1/1972 | Halbrook et al. | 240/468.5 |
| 3,873,482 | 3/1975 | Severson et al. | 260/27 |
| 4,357,456 | 11/1982 | Lopez et al. | 528/111.5 |
| 4,564,646 | 1/1986 | Nishigaki et al. | 525/922 |

FOREIGN PATENT DOCUMENTS

| | | |
|---|---|---|
| 520 541 | 12/1992 | European Pat. Off. . |
| 537 682 | 4/1993 | European Pat. Off. . |
| 42 33 734 | 4/1994 | Germany . |
| 59 018 774 | 1/1984 | Japan . |
| 59059761 | 4/1984 | Japan . |
| 4168103 | 6/1992 | Japan . |
| 6-093240 | 4/1994 | Japan . |

OTHER PUBLICATIONS

Naturharze, Terpentinoel, Talloel, Chemie und Technologie, pp. 175–185.

Paint Technology 19 (1955) p. 159.

Deutsche Farbenzeitschrift, 9 (1955) p. 463.

*Primary Examiner*—Randy Gulakowski
*Attorney, Agent, or Firm*—Wayne C. Jaeschke; John Daniel Wood; Henry E. Millson, Jr.

[57] ABSTRACT

A composition of matter comprising a resin obtained by a process comprising reacting at an elevated temperature an epoxidized ester of an unsaturated fatty acid with an aliphatic alcohol with a resin acid is provided. The equivalent ratio of epoxy groups of said epoxidized ester to carboxyl groups of said resin acid is in the range from 1.5:1 to 0.01:1. The resin is useful as a tackifier for adhesives and has a reduced tendency to crystallize.

24 Claims, No Drawings

MODIFIED RESINS MADE FROM THE REACTION OF EPOXIDIZED ESTERS AND RESIN ACIDS

BACKGROUND OF THE INVENTION

1. Field of the Invention

This invention relates to tackifier resins for adhesives based on epoxy-modified resin acids, to a process for their production and to their use in adhesives.

2. Prior Art

So-called tackifier resins are added to numerous polymer-based adhesives to modify and improve their adhesive properties. They are intended to increase the tackiness or the adhesion of the adhesives. The properties of the adhesive are ultimately determined by the formulation of the polymer/tackifier resin mixture.

Commercially available resins can be divided into two main groups, namely: resins based on natural resin acids and hydrocarbon resins.

The resin acids may be used in pure form or after modification, for example by disproportionation, addition of maleic anhydride or esterification with polyhydric alcohols, such as glycerol, trimethylol propane or pentaerythritol.

The pure resin acids have a number of disadvantages. For example, their resistance to autoxidation is inadequate. In addition, they tend to crystallize out after prolonged storage in dissolved form. Resin acids produced from tall oil have an unpleasant odor on account of the sulfur content of the crude products.

The phenomenon of resin crystallization is discussed in detail in the book by W. Sandermann entitled "Naturharze, Terpentinöl, Tallöl, Chemie und Technologie", pages 175–185, Springer, Berlin, 1960. The same book also describes processes which lead to a reduction in the tendency towards crystallization, including for example a thermal process in which the resins are heated to temperatures above 200° to 300° C. The isomerization which occurs leads to a reduction in the tendency towards crystallization. Other processes mentioned include disproportionation of the resins with elemental iodine or sulfur and the addition of formaldehyde.

EP-A2 0 520 541 describes a process in which resin acids are heated in the presence of phosphoric acid and are subsequently disproportionated by addition of iodine. The softening point of the resin acids and their tendency to crystallize are reduced by this process.

Routine deodorizing processes, such as steaming, passing nitrogen through the melt and distillation, may be used to reduce the odor of tall oil resins.

Unfortunately, known processes are attended by various disadvantages. Heat treatment on its own is unable adequately to reduce the tendency of the resins to crystallize. Although disproportionation with iodine, optionally in combination with phosphoric acid, is far more effective, halogenated hydrocarbons which are undesirable on account of their toxicological potential are formed by addition of iodine onto double bonds still present.

The deodorization of tall oil resin by conventional methods is unsatisfactory, presumably because some of the sulfur compounds responsible are substantially non-volatile.

The reaction of resin acids with glycidyl esters is also known, for example from R. N. Wheeler, Paint Technology 19, 159 (1955) or L. Korfhage, Deutsche Farbenzeitschrift, 9, 463 (1955). These publications describe the reaction of diglycidyl ethers of bisphenol A or its autocondensation products with resin acids or fatty acids. The compounds are used as raw materials for paints.

Aqueous dispersion adhesives for various applications, for example as pressure-sensitive adhesives, contact adhesives or flooring adhesives, have also been known for some time. They consist essentially of a polymer dispersion to which tackifier resins may be added to modify or adjust the adhesive properties. Since known tackifier resins are not added to the dispersion in solid form, they are added in the form of a solution, optionally at relatively high temperatures. A particularly suitable solvent for this purpose is toluene because, even in very small quantities, it is capable of preventing the resins from crystallizing out. However, the use of aromatic solvents is being increasingly restricted on toxicological and industrial hygiene grounds. Through the reduction and substitution of aromatic solvents, for example by aliphatic solvents, described in hitherto unpublished German patent application P 42 33 734.8, the problem of resin crystallization is moving increasingly into the foreground because these solvents are less effective in dissolving resins. Crystallization of the resin in the adhesive, for example after prolonged storage at low temperatures of 5° to 15° C., makes the adhesive unusable. Accordingly, there is an urgent need for resins with a reduced tendency to crystallize, more particularly for dispersion adhesives.

The problem addressed by the present invention was to provide tackifier resins which would not have any of the disadvantages described above. To this end, it is proposed in accordance with the invention to modify resin acids by a chemical reaction in such a way that their tendency to crystallize and/or the odor emitted from them is/are reduced. At the same time, the resin acids thus modified would be easy to incorporate in adhesives and, as tackifier resins, would improve their adhesive properties. An important requirement in this regard is that there should be no toxicological risk from the modified resin acids.

Another problem addressed by the invention was to provide dispersion adhesives which would have high adhesive strength and stability in storage and a mild odor.

SUMMARY OF THE INVENTION

The present invention relates to the use of resins obtainable by reaction of epoxy compounds with resin acids by a) reacting epoxy compounds with resin acids at elevated temperatures, b) optionally subjecting the resin acids to a heat treatment before or after this reaction, c) optionally conducting a further reaction with cyclic dicarboxylic anhydrides and/or with dicarboxylic acids containing olefinic double bonds after the epoxy addition, d) optionally esterifying excess carboxyl groups with the OH groups formed by the addition of epoxy groups onto carboxyl groups after the epoxy addition, as tackifier resins in adhesives.

The present invention also relates to resins obtainable by reaction of epoxidized fats with resin acids and, optionally, further reaction with dicarboxylic acids or dicarboxylic anhydrides.

The present invention also relates to a process for the production of resins for use as tackifier resins in adhesives, in which resin acids are heated for 2 to 6 hours to temperatures of 200° to 300° C., epoxy compounds are subsequently added at temperatures of, preferably, 100° to 150° C., the equivalent ratio of epoxy groups to carboxyl groups being from 0.95:1 to 0.01:1, and, finally, excess carboxyl groups are esterified with the hydroxyl groups formed for 2 to 4 hours at temperatures of 200° to 250° C., optionally in the presence of an esterification catalyst.

The present invention also relates to dispersion adhesives containing resins according to the invention or resins produced by the process according to the invention as tackifier resin, the ratio by weight of vinyl polymer to resin in the adhesive generally being between 20:1 and 0.3:1 and preferably between 3:1 and 0.5:1.

DETAILED DESCRIPTION OF THE INVENTION

Natural resin acids are obtained from wood either as balsamic resin still containing liquid terpenes through resinification of the living tree by cutting its bark and collecting the resin or as tree resin by solvent extraction of the resin from old tree stumps or from the tall oil formed in the sulfate process for producing cellulose.

The natural resins contain up to about 90% by weight of carboxyfunctional compounds, the remainder of around 10% by weight consisting of neutral, non-saponifiable compounds such as, for example, hydrocarbons or alcohols.

The resin acids are polycyclic $C_{20}$ carboxylic acids often containing double bonds. Examples of resin acids are levopimaric acid, neoabietic acid, palustric acid, abietic acid, dehydroabietic acid, tetrahydroabietic acid, pimaric acid and isopimaric acid.

The tall oil accumulating in the sulfate process consists essentially of fatty acids, resin acids and unsaponifiables. The resin acids may be isolated by distillation.

The epoxy compounds used may contain one or more epoxy groups in the molecule.

One particular embodiment of the invention is characterized by the use of epoxy compounds with a molecular weight above 100. Examples of such epoxy compounds are glycidyl ethers, such as allyl glycidyl ethers, or the glycidyl ethers of phenols, more particularly the phenols derived from bisphenol A, glycidyl esters of carboxylic acids, such as the glycidyl ester of a branched $C_{10}$ carboxylic acid commercially available as Cardura® E 10, and α-epoxides of α-olefins containing 8 to 18 carbon atoms.

Epoxidized fatty compounds obtainable by epoxidation of fatty compounds containing olefinic double bonds are particularly preferred. Reaction products of resin acids with epoxidized fatty compounds are still unknown. A sub-group of these fatty compounds are the esters of unsaturated fatty acids with aliphatic alcohols. The olefinic double bonds are situated in the fatty acid component of these fatty acid esters. The unsaturated fatty acids generally contain 10 to 24 carbon atoms and 1 to 5 olefinic double bonds. Examples of unsaturated fatty acids are oleic acid, elaidic acid, linoleic acid, linolenic acid, myristoleic acid, palmitoleic acid, gadoleic acid, erucic acid, ricinoleic acid and arachidonic acid.

The aliphatic alcohols may be monohydric, linear or branched alcohols containing 1 to 18 carbon atoms, for example methanol, ethanol, 1-propanol, 2-propanol, 1-butanol, 2-butanol, 1-hexanol, 2-ethylhexanol, 1-octanol and 1-dodecanol. Polyhydric alcohols, for example ethanediol, propanediol, glycerol, trimethylol propane, pentaerythritol and polyglycerol, may be esterified with unsaturated fatty acids and represent fatty compounds in the context of the invention.

Epoxidized fatty compounds derived from triglycerides or methyl esters of unsaturated fatty acids are particularly preferred.

Examples include epoxidized soybean oil, epoxidized linseed oil, epoxidized rapeseed oil and epoxystearic acid methyl ester.

Epoxidized fatty alcohols are also suitable compounds in the context of the invention.

The resin acids are modified by reaction of their carboxyl groups with the epoxy group. The reaction is best carried out at elevated temperature in standard reaction vessels. It can be of advantage to carry out the reaction in the presence of a catalyst known per se, such as a tertiary amine, for example dimethyl benzylamine, triethylamine, dimethylaminopyridine or dimethyl octadecylamine, a quaternary ammonium salt, such as trimethyl benzyl ammonium hydroxide, or a lithium compound, such as lithium hydroxide, lithium carbonate or an Li soap. The catalysts mentioned may be added in quantities of 0.001 to 1% by weight, based on the mixture as a whole.

It can be useful to subject the resin acid to a heat treatment before or after modification with the epoxy compound by heating the resin acid for 2 to 6 hours at temperatures of around 200° to 300° C.

The process according to the invention for producing the modified resin acids is preferably carried out by initially melting the resin acids in an inert gas atmosphere in a reaction vessel. The resin acids are then heated with stirring for around 2 to 6 hours to a temperature of around 200° to 300° C. The epoxy compound is then added, preferably after cooling of the melt to around 150° C. If desired, the catalyst may also be added. The reaction mixture is then stirred for about 2 to 4 hours at a temperature of around 150° to 250° C.

In one particularly preferred embodiment of the invention, the hydroxyl group formed by addition of the carboxyl group onto the epoxy group is esterified with carboxyl groups still present in the reaction mixture with elimination of water. If desired, an esterification catalyst known per se, preferably based on tin compounds, may be added in typical quantities of 0.001 to 0.1% by weight, based on the mixture, to accelerate the esterification reaction.

The process according to the invention may also be carried out by initially adding the epoxy compound and, optionally, the catalyst and then heating for 2 to 6 hours to temperatures of around 200° to 300° C.

The equivalent ratio of epoxy(epo) groups to carboxyl groups (epo:COOH) may be between 1.5:1 and 0.01:1 and is preferably between 0.95:1 and 0.05:1.

For certain applications, particularly where the modified resin acids according to the invention are used in the form of an aqueous dispersion as tackifier resins for flooring adhesives, it can be useful to carry out an after-reaction with a cyclic carboxylic anhydride or with a dicarboxylic acid containing olefinic double bonds following the epoxy modification.

Suitable cyclic dicarboxylic anhydrides are, for example, succinic, phthalic, tetrahydrophthalic, hexahydrophthalic and trimellitic anhydride. Maleic anhydride is preferably used. Fumaric acid, maleic acid or itaconic acid, for example, may be used as the dicarboxylic acid containing olefinic double bonds.

The post-modification reaction is carried out by adding the anhydride or the unsaturated dicarboxylic acid to the modified resin acid and then stirring for about 1 to 3 hours at temperatures of around 100° to 150° C. Under these conditions, the anhydride ring can be added onto the hydroxyl groups formed from the reaction of the epoxy groups with the carboxyl groups. if anhydrides containing olefinic double bonds are used, Diels-Alder reactions with diene groups from the resin acids can also occur. The post-modification reaction with maleic or fumaric acid generally requires a relatively high temperature of around 200° to 250° C.

The cyclic anhydrides or dicarboxylic acids containing olefinic double bonds are generally added in quantities of 1 to 40% by weight and preferably in quantities of 5 to 20% by weight, based on modified resin acid.

The resin acids modified by the process according to the invention have a reduced tendency towards crystallization. If resin acids emanating from tall oil are modified by the process, the pungent odor characteristic of these compounds is also greatly reduced.

Dispersion adhesives consisting essentially of a polymer, a tackifier resin, a solvent and water can be produced with the tackifier resins according to the invention.

The polymers of these adhesives generally consist of vinyl monomers, for example acrylates, styrene/acrylate copolymers, acrylate/vinyl acetate copolymers, ethylene/vinyl acetate copolymers, acrylate/acrylonitrile copolymers or ethylene/vinyl acetate/acrylate copolymers.

These polymers are prepared in emulsified form by known methods of emulsion polymerization.

The tackifier resins are generally based on natural resin acids.

The ratio by weight of vinyl polymer to tackifier resin in the adhesive is determined by the application envisaged and is generally between 20:1 and 0.3:1 and preferably between 3:1 and 0.5:1.

Suitable solvents are, above all, hydrocarbons, more particularly isoparaffins, glycol ethers of aliphatic or aromatic alcohols and esters thereof, for example butyl diglycol, butyl glycol, methoxypropanol, butyl glycol acetate, butyl diglycol acetate and methoxypropyl acetate, and esters, for example butyl acetate.

Depending on the particular application envisaged, the adhesive may contain other additives, such as waxes, fillers, stabilizers, pigments, pigment dispersants, plasticizers, foam inhibitors, viscosity regulators and preservatives.

A dispersion adhesive generally contains 8 to 55% by weight of vinyl polymer 5 to 20% by weight of tackifier resin 1 to 10% by weight of solvent 20 to 55% by weight of fillers 0.5 to 5% by weight of emulsifiers 0.5 to 5% by weight of stabilizers;

remainder water.

Production is generally carried out as follows:

1. start with a polymer dispersion,
2. add emulsifiers and other additives,
3. add the fillers,
4. add the resin solution of tackifier resin and solvent,
5. adjust the viscosity with water.

The dispersion adhesives according to the invention are particularly suitable for applying floor coverings. Floor coverings in the context of the invention are materials of wood, textiles or elastic materials, such as PVC, cushion vinyl, rubber, linoleum, which are laid on the floor screed and serve as interior decor or to insulate or protect the floor. They are preferably used for textile floor coverings, above all carpets and plastic floor coverings, such as PVC tiles.

The tackifier resins according to the invention may be used for adhesives based on various polymers, for example polyacrylates, styrene/butadiene copolymers, ethylene/vinyl acetate copolymers and polyvinyl acetate. The quantity used depends upon the nature of the polymer. For example, quantities of 10 to 40% by weight are normally used for acrylates while quantities of 10 to 60% by weight, based on the adhesive, are normally used for styrene/butadiene copolymers. The adhesives may be applied as hotmelt adhesives or from solvents.

EXAMPLES

Starting products:

Epoxidized soybean oil, Edenol® D 81, a product of Henkel KGaA, epoxy content 6.4% by weight oxygen Epoxystearic acid methyl ester, epoxy content 4.8% by weight oxygen Tall oil resin (Beviros® 3, a product of Bergvik Kemi), acid value 168.6

Balsamharz® N, a product of Hercules, acid value 173.3

Example 1

500 g of Indonesian balsamic resin with an acid value of 177.3 are melted in a three-necked flask equipped with a stirrer, nitrogen inlet and reflux condenser with water separator and heated for 3 h to 230° C. 10 ml of a condensate consisting largely of water are formed. 50 g of epoxidized soybean oil are then added, followed by stirring for 1 hour at 200° C. A brittle resin with an acid value of 125 is obtained.

Example 2

500 of Indonesian balsamic resin with an acid value of 177.3 are treated in the same way as in Example 1, except that 50 g of epoxystearic acid methyl ester are added instead of the epoxidized soybean oil. A brittle resin with an acid value of 126 is obtained.

Example 3

500 g of Indonesian balsamic resin with an acid value of 177.3 are treated in the same way as in Example 2 except that the epoxystearic acid methyl ester is added in a quantity of 75 g. A brittle resin is obtained.

Example 4

500 g of Indonesian balsamic resin with an acid value of 177.3 are treated in the same way as described in Example 2 except that the epoxy-stearic acid methyl ester is added in a quantity of 125 g. A brittle resin is obtained.

Example 5

In the apparatus described in Example 1, 250 g of epoxidized soybean oil, 308 g of Indonesian balsamic resin (acid value 177.3) and 0.6 g of LiOH are heated with stirring for 3 h to 150°–160° C., 4 ml of an aqueous condensate being formed. The mixture is then heated for 1 hour to 200° C. After cooling to 120° C., 98 g of maleic anhydride are added and the mixture is stirred for 1 h at that temperature. A brittle resin with an acid value of 74.2 is obtained.

Example 6

In the apparatus described in Example 1, 374 g of epoxystearic acid methyl ester, 317 g of Indonesian balsamic resin (acid value 177.3) and 0.7 g of LiOH are heated with stirring for 3 h to 150°–160° C., 7 ml of an aqueous condensate being formed. The mixture is then heated for 1 hour to 200° C. After cooling to 120° C., 98 g of maleic anhydride are added and the mixture is stirred for 1 hour at that temperature. A viscous resin is obtained.

Example 7

Starting products:
100 g Edenol® D 81=0.4125 mole epoxide
106.8 g Balsamharz® N=0.33 mole COOH
0.2 g LiOH In a 1 liter three-necked flask equipped with a stirrer, water separator and nitrogen inlet, the products are heated for 6 h to 150° C., the acid value falling to 8. A brittle resin is obtained.

Modification of tall oil resin to reduce odor

Example 8

500 g of tall oil resin with an acid value of 168.3 (Beviros 3®) are treated for 6 h at 230° C. as described in Example 1. No condensate is formed. 50 g of epoxystearic acid methyl ester are then added and the mixture is stirred for 2 hours at 200° C.

Example 9

Following the procedure of Example 8, 500 g of tall oil resin (Beviros 3®) are modified with 75 g of epoxystearic acid methyl ester.

Example 10

Following the procedure of Example 8, 500 g of tall oil resin (Beviros NC®) are modified with 75 g of epoxystearic acid methyl ester.

Modification with epoxide and subsequent esterification

Example 11

510 g of Indonesian balsamic resin with an acid value of 190.1 and 80 g of xylene are melted in a three-necked flask equipped with a stirrer, nitrogen inlet and reflux condenser with water separator and heated for 5 h to 200° C. 7 ml of a condensate consisting largely of water are formed. 75 g of epoxystearic acid methyl ester with an epoxy content of 4.8% by weight are then added and the mixture is stirred for 5 hours at temperatures of 220° to 230° C. Another 3 ml of an aqueous condensate are formed. The xylene is removed in vacuo. A brittle resin with an acid value of 126.3 is obtained.

Example 12

510 g of Indonesian balsamic resin with an acid value of 190.1, 80 g of xylene and 125 g of epoxystearic acid methyl ester are reacted as in Example 11. A resin showing cold flow with an acid value of 99.7 is obtained.

Example 13

510 g of Indonesian balsamic resin with an acid value of 190.1, 80 g of xylene and 75 g of epoxidized linseed oil with an epoxy content of 9.2% by weight are reacted as in Example 11. A brittle resin with an acid value of 110.6 is obtained.

Example 14

510 g of Indonesian balsamic resin with an acid value of 190.1, 80 g of xylene and 55 g of epoxidized 1-dodecene (=0.31 mole of epoxide) are reacted as in Example 11. A brittle resin is obtained.

Example 15

510 g of Indonesian balsamic resin with an acid value of 190.1, 80 g of xylene and 45 g of phenyl glycidyl ether (=0.30 mole of epoxide) are reacted as in Example 11. A brittle resin is obtained.

Example 16

510 g of tall oil resin (Beviros® 3) with an acid value of 168.6, 80 g of xylene and 100 g of epoxystearic acid methyl ester are reacted as in Example 11. A resin showing cold flow with an acid value of 95.2 is obtained.

Acetone test:

The acetone test measures the tendency of the resins to crystallize.

To carry out the acetone test, 7 parts by weight of resin are shaken with 3 parts by weight of acetone in a test tube, stored at room temperature (around 20° C.) and the time taken for crystals to form is measured.

TABLE 1

| Tendency Towards Crystallization | |
|---|---|
| Resin | Time to crystallization |
| Balsamic resin | 15 mins. |
| Tall oil resin | 1 min. |
| Example 1 | 2 weeks |
| Example 2 | 2 weeks |
| Example 3 | 2 weeks |
| Example 4 | >2 weeks |
| Example 5 | >2 weeks |
| Example 6 | >2 weeks |
| Example 7 | 1 week |
| Example 8 | 1 day |
| Example 9 | >2 weeks |
| Example 10 | >2 weeks |
| Example 11 | >2 weeks |
| Example 12 | >2 weeks |
| Example 13 | >2 weeks |
| Example 14 | >2 weeks |
| Example 15 | >2 weeks |
| Example 16 | 1 week |

TABLE 2

| Odor Test for Tall Oil Resin Derivatives | |
|---|---|
| Tall oil resin Beviros ® 3 | Pungent, resinous |
| Tall oil resin Beviros ® NC | Pungent, resinous |
| Example 8 | Moderate, resinous |
| Example 9 | Moderate, of fat |
| Example 10 | Moderate, of fat |

Adhesive formulation

A resin solution with a solids content of 80% by weight is prepared from 120 g of a resin or a resin modified in accordance with Example 11 and 30 g of a mixture of 80 parts of isoparaffin (Isopar® L, a product of Exxon) and 20 parts of dibutyl diglycol acetate.

30 g of this solution are heated to 70° C. and stirred with a dissolver into 350 g of Acronal® A 323 (BASF), a polymer dispersion widely used for dispersion adhesives.

After addition of 0.5% by weight of Latecol® (BASF), a thickener based on an acidic polyacrylate, 50 g of butyl diglycol acetate are added, the adhesive is filled with 450 g of a standard calcitic filler and the viscosity is adjusted with water.

The final adhesive is suitable for use in the laying of PVC and cushion vinyl coverings.

Three adhesives are prepared in accordance with the basic formulation described above and adjusted to a viscosity of 18,000 mPa.s, as measured with a Brookfield viscosimeter at 20° C.:

a) with non-modified resin (Indonesian balsamic resin) and toluene as sole solvent
b) with non-modified resin (Indonesian balsamic resin) and a mixture of Isopar® L and butyl diglycol acetate
c) with modified resin according to Example 11 and a mixture of Isopar® L and butyl diglycol acetate.

The three adhesives were performance-tested, the results being set out in Table 3.

TABLE 3

Performance Testing of the Adhesives

| Adhesive | Stringing after [mins.] | Initial Strength | Ultimate Strength | Odor | Condition after 6 months |
|---|---|---|---|---|---|
| a | 10–15 | O.K. | O.K. | Pungent, of toluene | Stable |
| b | 10–15 | O.K. | O.K. | Mild | Highly viscous, cannot be applied |
| c | 10–15 | O.K. | O.K. | Mild | Stable |

Stringing is a measure of the onset of tack which is the adhesive force required for instant bonding. O.K. means that the requirements are satisfied.

The tests clearly show that adhesives with a mild pleasant odor and high stability in storage can only be produced with the resins modified to reduce their tendency to crystallize.

What is claimed is:

1. A composition of matter comprising a resin obtained by a process comprising reacting at an elevated temperature (1) an epoxidized ester of an unsaturated fatty acid and an aliphatic alcohol with (2) a resin acid which is a polycyclic $C_{20}$ carboxylic acid.

2. The composition claimed in claim 1 wherein in the equivalent ratio of epoxy groups of said epoxidized ester to carboxyl groups of said resin acid is in the range from 1.5:1 to 0.01:1.

3. The composition claimed in claim 1 wherein in the equivalent ratio of epoxy groups of said epoxidized ester to carboxyl groups of said resin acid is in the range from 0.95:1 to 0.05:1.

4. The composition claimed in claim 1 wherein said process further comprises subjecting said resin acid to a heat treatment.

5. The composition claimed claim 1 wherein said heat treatment is carried out for 2 to 6 hours at a temperature of 200° to 300° C.

6. The composition claimed in claim 1 wherein said process further comprises esterifying excess carboxyl groups of said resin acid with hydroxyl groups formed by the addition of epoxy groups onto carboxyl groups.

7. The composition claimed in claim 6 wherein said esterifying is at a temperature of 170° to 250° C.

8. The composition claimed in claim 1 wherein component (2) is obtained from a member selected from the group consisting of natural balsamic resins, tree resins, and tall oil.

9. The composition claimed in claim 1 wherein said epoxidized ester is epoxystearic acid methyl ester.

10. The composition claimed in claim 1 wherein said resin has a reduced tendency to crystallize.

11. A composition of matter comprising a resin obtained by a process comprising:

heat treating a resin acid for 2 to 6 hours at 200° to 300° C., reacting said resin acid with epoxystearic acid methyl ester, the equivalent ratio of epoxy groups to carboxyl groups being in the range from 0.95:1 to 0.05:1, and esterifying excess carboxyl groups of said resin acid with hydroxyl groups formed by the addition of epoxy groups onto carboxyl groups.

12. A process comprising reacting at an elevated temperature (1) an epoxidized ester of an unsaturated fatty acid and an aliphatic alcohol with (2) a resin acid which is a polycyclic $C_{20}$ carboxylic acid.

13. The process claimed in claim 12 wherein in the equivalent ratio of epoxy groups of said epoxidized ester to carboxyl groups of said resin acid is in the range from 1.5:1 to 0.01:1.

14. The process claimed in claim 12 wherein in the equivalent ratio of epoxy groups of said epoxidized ester to carboxyl groups of said resin acid is in the range from 0.95:1 to 0.05:1.

15. The process claimed in claim 12 wherein said process further comprises subjecting said resin acid to a heat treatment.

16. The process claimed in claim 12 wherein said heat treatment is carried out for 2 to 6 hours at a temperature of 200° to 300° C.

17. The process claimed in claim 12 wherein said process further comprises esterifying excess carboxyl groups of said resin acid with hydroxyl groups formed by the addition of epoxy groups onto carboxyl groups.

18. The process claimed in claim 17 wherein said esterifying is at a temperature of 150° to 250° C.

19. The process claimed in claim 12 wherein said epoxidized ester is epoxystearic acid methyl ester.

20. The process claimed in claim 12 wherein the product of said process has a reduced tendency to crystallize.

21. A process of producing a resin having a reduced tendency to crystallize comprising:

heat treating a resin acid which is a polycyclic $C_{20}$ carboxylic acid for 2 to 6 hours at 200° to 300° C., reacting said resin acid with epoxystearic acid methyl ester, the equivalent ratio of epoxy groups to carboxyl groups being in the range from 0.95:1 to 0.05:1, and esterifying excess carboxyl groups of said resin acid with hydroxyl groups formed by the addition of epoxy groups onto carboxyl groups.

22. The process claimed in claim 21 wherein said epoxystearic acid methyl ester is added to said resin acid at a temperature of 100° to 150° C. and esterifying is at a temperature of 200° to 250° C. for 2 to 4 hours.

23. In a method of tackifying an adhesive composition, the improvement comprising using as a tackifier, a composition as claimed in claim 1.

24. In a method of tackifying an adhesive composition, the improvement comprising using as a tackifier, a composition as claimed in claim 11.

* * * * *